March 9, 1948. B. AAS 2,437,236
APPARATUS FOR CUTTING THE BEVEL ON HULL PLANKING
Filed Feb. 24, 1939
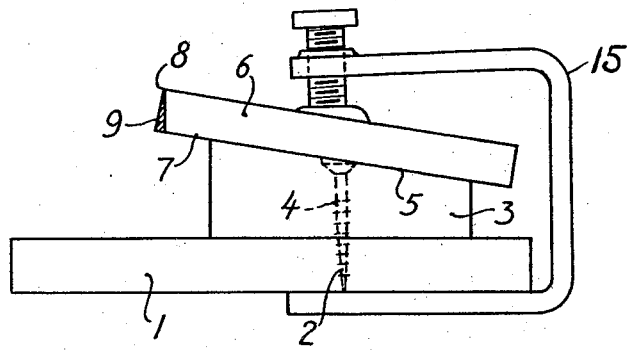
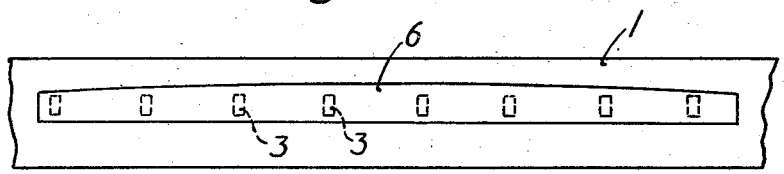
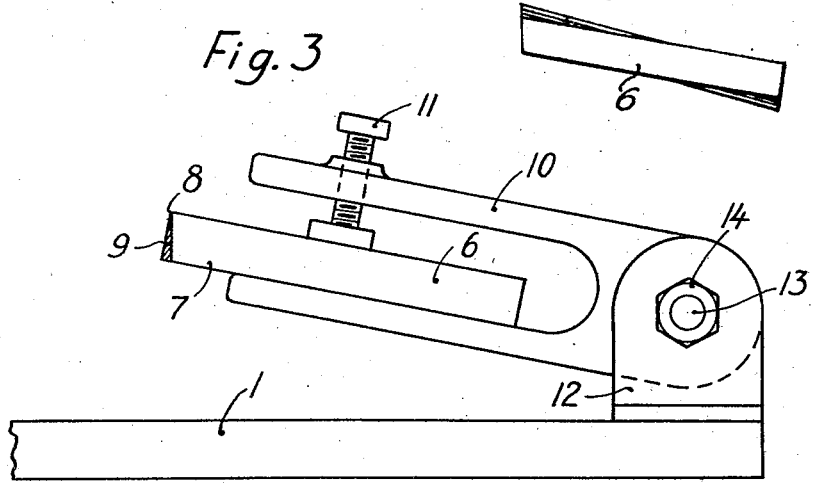
Bjarne Aas
By
Watson, Cole, Grindle & Watson
Attys.

Patented Mar. 9, 1948

2,437,236

UNITED STATES PATENT OFFICE 2,437,236

APPARATUS FOR CUTTING THE BEVEL ON HULL PLANKING

Bjarne Aas, Fredrikstad, Norway; vested in the Attorney General of the United States Application February 24, 1939, Serial No. 258,310
In Norway November 12, 1938

4 Claims. (Cl. 9—6)

The usual method of cutting the bevel on hull planks in carvel built vessels is to first mark the bevel angles on a board and then by means of a gauge control the different bevel angles along the planks as they are cut, the planks being clamped down to a bench in a vertical position.

The present invention, on the other hand, proposes that the planks, when the bevel is to be formed by planing or other working method, be clamped to a table or the like in a position relatively to the same corresponding to the continuously varying bevel angle of the plank at every point along the length of the plank, so as to allow the continuous bevel form to be obtained by means of a tool, the cutting edge or edges of which is or are perpendicular to the said table. If a tool is used the edge or edges of which is or are at another angle to the table, this must be considered in the determination of the angle at which the plank is to be clamped to the table or support. Conveniently the plank is clamped on wooden blocks or in clips spaced at suitable intervals along the table, for instance in accordance with the frame spacing of the vessel, the blocks or clips being so adjusted that the plank when clamped, is situated at angles to the table corresponding to the bevel angle at each individual point. The fact that the plank is clamped at different angles with the tables at each of these spaced points very obviously requires that the plank be twisted or warped when it occupies the clamps in a similar way to the conditions it will be in when applied to the carvel built vessel.

In order to enable the tool to be passed continuously along the length of the plank during the cutting, the edge of the plank is arranged so as to extend freely outwardly from the blocks or clips.

The cutting or planing may be carried out by hand or by means of a planing machine or may, if desired, be carried out by means of a cutter or another suitable tool, and the cutting may be completed in one operation.

The accompanying drawing illustrates schematically some embodiments of arrangements suitable for the carrying out of the method according to the invention.

In the drawings,

Figure 1 is a view in end elevation of apparatus embodying the principles of the present invention, a plank being clamped therein;

Figure 2 is a diagrammatic plan view showing a suggested arrangement of the clamp wedges beneath a plank and resting upon a work bench or table;

Figure 3 is an end view similar to Figure 1 showing another embodiment of the clamping means applied to the purposes of the present invention; and Figure 4 is an end view of a warped and twisted plank as it would be clamped in the apparatus, and after the left-hand end had been planed or cut in accordance with the invention.

The Figures 1 and 2 illustrate the use of blocks arranged on a table for securing the plank in the desired position relatively to the table. The numeral 1 designates the table which is provided with holes 2 in places where it is desired to locate blocks 3. The blocks are secured to the table 1 by means of screws or nails 4. The top surfaces 5 of the blocks 3 are inclined relatively to the table 1 corresponding to the bevel angle to which the plank 6 is to be cut at that particular point. The plank is clamped against the surfaces 5 by means of clamping frames 15 or other suitable means, and will thus be warped or twisted to a position where a straight cut taken at right angles to the top of the table will apply a continuously varying bevel to the edge as referred to the broader surfaces of the plank in unwarped condition. A warped or twisted plank having the proper bevel applied to the left-hand edge is shown at 6 in Figure 4 of the drawings. This is the condition of the plank in the apparatus, and also corresponds to the ultimate condition of the plank in the boat. A portion 7 of the plank extends freely beyond the blocks 3, whereby the cutting tool may be passed along the whole length of the plank unhindered by the blocks. The portion 9 of the plank which is to be cut away in order to obtain the bevel form is bounded by a line extending perpendicularly from the edge 8 of the plank of the table 1, and may be cut away by means of a tool passed along the table and having its cutting edge perpendicular to the same. The operation may also conveniently be carried out by means of a rotating mechanical tool. As each individual block adjusts or warps the plank at an angle corresponding to the bevel at that particular point of the same, a continuous smooth surface of correct bevel angles along the whole length of the plank is obtained.

As shown in Figure 3 the plank 6 may be fastened in clamping frames 10 with screws 11, each clamping frame being pivoted on a support 12 by means of a pin 13, the support being secured to the table 1, for instance by means of screws. The clamping frames 10 then are adjusted so that the plank 6 at each frame is adjusted or twisted according to the bevel angle in relation to the table 1, and is then locked in this position for instance by means of a nut 14. The cutting is carried out in the manner described in connection with the Figures 1 and 2.

In the appended claims the expression "side surfaces of the plank" will be understood as designating the broad surfaces or faces of the plank as distinguished from the side and end edges thereof.

What I claim is:

1. In the manufacture of vessels such as sailing-boats where a sheathing of wooden planks or boards are mounted edge to edge on ribs forming the skeleton of the boat and where these planks first are shaped to suitable taper according to the varying outside distance from the edge of the boat to its keel at each point along its length, a method for shaping the edge of the planks with such an angle at any point to its plane surface at this point that it when twisted in shape on the said skeleton will abut properly with the meeting edge of the adjacent plank, consisting in the twisting of the plank about its longitudinal axis at each point along its length to the same degree, that each point will be twisted, when twisted and bent in place on the boat, holding the plank in this twisted position on a working bench, and planing the edge of the plank so held by means of a planing tool, the working edge of which being made to pass along the said edge without changing its angular position with reference to said working bench.

2. Improvement in means for shaping the abutting edges of planks for boats with respect to the angle of the side edge of the plank to the plane surface of the plank at each point along its length, comprising a working bench with a guiding edge for a planing tool and a plurality of spaced clamping means for the plank, each consisting in means adapted individually to hold the plank at its location at a given angle in relation to the said guiding edge, the said plurality of clamping means being arranged at such a distance from each other so as to correspond to the distance between the ribs in the skeleton of the boat to be built.

3. Apparatus for cutting continuously varying bevel edges of hull planks for carvel built vessels, comprising in combination a work bench having a straight guiding surface thereon for a planing tool, a plurality of clamping members carried by the bench and disposed at intervals thereon, each of said members comprising individual means for gripping said plank at longitudinally spaced relatively narrow transverse portions and holding said portions rigidly at a given angle in relation to said guiding surface, whereby when all of the clamping members are secured, the plank is held in the same warped twisted condition that it is to assume in the finished hull, and a planing tool adapted to be moved along said guiding surface and to chamfer the plank edge presented to it by said plurality of clamping members.

4. Apparatus for cutting continuously varying bevel edges of hull planks for carvel built vessels, comprising in combination a work bench having a straight guiding surface thereon for a cutting tool, a plurality of clamping members carried by the bench and disposed at intervals thereon, each of said members comprising individual means for gripping said plank at longitudinally spaced relatively narrow transverse portions and holding said portions rigidly at a given angle in relation to said guiding surface, whereby when all of the clamping members are secured, the plank is held in the same warped twisted condition that it is to assume in the finished hull, a cutting tool adapted to be moved along said guiding surface and to chamfer the plank edge presented to it by said plurality of clamping members, and means for independently adjusting the angle of each of said gripping members with respect to said guiding surface, whereby the angle of each gripped portion of said plank may be varied to suit the nature of the particular vessel under construction.

BJARNE AAS.

REFERENCES CITED

The following references are of record in the file of this patent:

UNITED STATES PATENTS

| Number | Name | Date |
| --- | --- | --- |
| 976,296 | Robbins | Nov. 22, 1910 |
| 1,286,417 | Rohleen | Dec. 3, 1918 |
| 1,454,455 | Sargent | May 8, 1923 |
| 1,535,661 | Garrity et al. | Apr. 28, 1925 |
| 529,235 | Bainbridge | Nov. 13, 1894 |
| 1,828,103 | De Witt | Oct. 20, 1931 |
| 976,097 | Peterson | Nov. 15, 1910 |
| 149,654 | Hanna et al. | Apr. 14, 1874 |
| 106,874 | Sayer | Aug. 30, 1870 |
| 187,037 | Milton | Feb. 6, 1877 |

FOREIGN PATENTS

| Number | Country | Date |
| --- | --- | --- |
| 19,164 | Switzerland | Apr. 26, 1899 |